United States Patent
Bernard et al.

(10) Patent No.: US 10,726,429 B2
(45) Date of Patent: *Jul. 28, 2020

(54) METHOD AND SYSTEM FOR CREATING A CONTROL GROUP FOR CAMPAIGN MEASUREMENTS

(71) Applicant: Mastercard International Incorporated, Purchase, NY (US)

(72) Inventors: Serge Bernard, Danbury, CT (US); Nikhil Malgatti, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/810,912

(22) Filed: Nov. 13, 2017

(65) Prior Publication Data

US 2018/0068331 A1     Mar. 8, 2018

Related U.S. Application Data

(63) Continuation of application No. 14/080,243, filed on Nov. 14, 2013, now Pat. No. 9,836,758.

(51) Int. Cl.
*G06Q 30/00*     (2012.01)
*G06Q 30/02*     (2012.01)

(52) U.S. Cl.
CPC ..... *G06Q 30/0202* (2013.01); *G06Q 2220/10* (2013.01)

(58) Field of Classification Search
CPC .................................................. G06Q 30/0242
(Continued)

(56) References Cited

U.S. PATENT DOCUMENTS

2008/0243587 A1    10/2008   Chang
2011/0071895 A1    3/2011   Masri
(Continued)

OTHER PUBLICATIONS

Takahashi, Bruno, Social Marketing for the Environment: A Comparative Analysis of Theory and Practice, ProQuest Dissertations Publishing (Year: 2007).*

*Primary Examiner* — Matthew L Hamilton
(74) *Attorney, Agent, or Firm* — Buchanan Ingersoll & Rooney PC

(57) ABSTRACT

A method for creating a control group for campaign measurements includes: storing a plurality of consumer profiles, each profile including data related to a consumer including an account identifier, spend behavior, and microsegment associated with the consumer; receiving a plurality of measurement profiles, each profile including data related to a consumer including a specific account identifier and indication of participation or non-participation in a campaign; associating each consumer profile with a measurement profile where the included account identifier corresponds to the specific account identifier of the measurement profile; identifying a campaign group, the campaign group including consumer profiles, each profile including a common microsegment and spend behavior and associated with a measurement profile indicating participation in the campaign; and identifying a control group, the control group including consumer profiles, each profile including the common microsegment and spend behavior and associated with a measurement profile indicating non-participation in the campaign.

18 Claims, 7 Drawing Sheets

(58) Field of Classification Search
USPC .......................................................... 705/14
See application file for complete search history.

(56) References Cited

U.S. PATENT DOCUMENTS

| | | | |
|---|---|---|---|
| 2011/0178849 A1* | 7/2011 | Rane | G06Q 30/02 705/7.31 |
| 2012/0039469 A1* | 2/2012 | Mueller | G06Q 20/12 380/252 |
| 2012/0066065 A1* | 3/2012 | Switzer | G06Q 20/10 705/14.53 |
| 2012/0310745 A1 | 12/2012 | Bhatia | |
| 2013/0024274 A1 | 1/2013 | Villars | |
| 2014/0172506 A1 | 6/2014 | Parsell | |
| 2015/0235261 A1 | 8/2015 | Shulman | |
| 2015/0348095 A1 | 12/2015 | Dixon | |

* cited by examiner

METHOD AND SYSTEM FOR CREATING A CONTROL GROUP FOR CAMPAIGN MEASUREMENTS

FIELD

The present disclosure relates to the creation of control groups for campaign measurements, specifically the use of account identifiers and measurement profiles to identify a control group of consumers that corresponds to a group of consumers that are part of a campaign based on spend behaviors and microsegments.

BACKGROUND

Merchants, advertisers, and other entities often have a desire to develop more effective and more efficient methods of advertising and reaching out to consumers. Along with developing methods for reaching consumers, these entities are often also concerned with evaluating the success or failure of such methods. By identifying the effect that an advertising campaign has on consumers, an advertiser can better develop future campaigns that have an even greater positive effect on consumers. Thus, it is of interest to these entities to utilize more efficient and more effective methods for evaluating the success of a campaign.

However, many methods for measuring advertising effectiveness often require participation of consumers directly, such as surveys and polls. In addition to requiring consumer participation, there is also a possibility that the information provided by the consumers may be inaccurate or fabricated, especially if the survey or poll is anonymous. Some entities may analyze revenue or consumer activity for a merchant following an advertising campaign. However, such analysis may not be directly correlated to a specific campaign, the identification of consumers who were exposed to an advertisement and/or participated in a campaign may be difficult, and detailed information regarding effectiveness as to different groups of consumers (e.g., based on demographics) may also be unavailable. In addition, many consumers may also be concerned for personal privacy and security, and therefore resistant to detailed information regarding their shopping behavior being obtained and/or analyzed.

One method that has been designed to measure the effectiveness of an advertisement, while still maintaining consumer privacy and security, is described in U.S. Patent Publication No. 2013/0024274, entitled "Method and System for Measuring Advertising Effectiveness Using Microsegments," filed on Apr. 3, 2012, to Curtis Villars, which is herein incorporated by reference in its entirety. This method utilizes microsegments to maintain consumer privacy, while also providing analysis of advertising effectiveness for a specific demographic based on each individual microsegment. In some instances, a microsegment that corresponds to a control group that is not exposed to an advertisement may be identified. However, by the control group being a separate microsegment, the method is unable to identify a control group of consumers that directly correspond to consumers in a campaign group, and thus may provide results that are inaccurate.

The identification of a control group of consumers that are not participants in a campaign, yet directly correspond to a group of consumers that do participate in the campaign, may yield more accurate, and therefore more effective, results regarding advertising effectiveness. Such data may provide a detailed look at the effect of an advertisement on a very specific type of consumer, while still maintaining a high level of privacy and security for the consumers. Thus, there is a need for a technical solution to identify a control group of consumers for campaign measurements that does not sacrifice the personal privacy and security of consumers.

SUMMARY

The present disclosure provides a description of systems and methods for creating a control group of consumers for campaign measurements.

A method for creating a control group for campaign measurements includes: storing, in a consumer database, a plurality of consumer profiles, wherein each consumer profile includes data related to a consumer including at least an account identifier, a spend behavior, and a microsegment associated with the related consumer; receiving, by a receiving device, a plurality of measurement profiles, wherein each measurement profile includes data related to a consumer including at least a specific account identifier and an indication of participation or non-participation in a campaign; associating, in the consumer database, each consumer profile with a specific measurement profile where the included account identifier corresponds to the specific account identifier included in the respective specific measurement profile; identifying, by a processing device, a campaign group, wherein the campaign group includes at least one consumer profile, each of the at least one consumer profile including a common microsegment and a common spend behavior and being associated with a measurement profile including an indication of participation in the campaign; and identifying, by the processing device, a control group, wherein the control group includes at least one consumer profile, each of the at least one consumer profile including the common microsegment and the common spend behavior and being associated with a measurement profile including an indication of non-participation in the campaign.

A system for creating a control group for campaign measurements includes a consumer database, a receiving device, and a processing device. The consumer database is configured to store a plurality of consumer profiles, wherein each consumer profile includes data related to a consumer including at least an account identifier, a spend behavior, and a microsegment associated with the related consumer. The receiving device is configured to receive a plurality of measurement profiles, wherein each measurement profile includes data related to a consumer including at least a specific account identifier and an indication of participation or non-participation in a campaign. The processing device is configured to: associate, in the consumer database, each consumer profile with a specific measurement profile where the included account identifier corresponds to the specific account identifier included in the respective specific measurement profile; identify a campaign group, wherein the campaign group includes at least one consumer profile, each of the at least one consumer profile including a common microsegment and a common spend behavior and being associated with a measurement profile including an indication of participation in the campaign; and identify a control group, wherein the control group includes at least one consumer profile, each of the at least one consumer profile including the common microsegment and the common spend behavior and being associated with a measurement profile including an indication of non-participation in the campaign.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
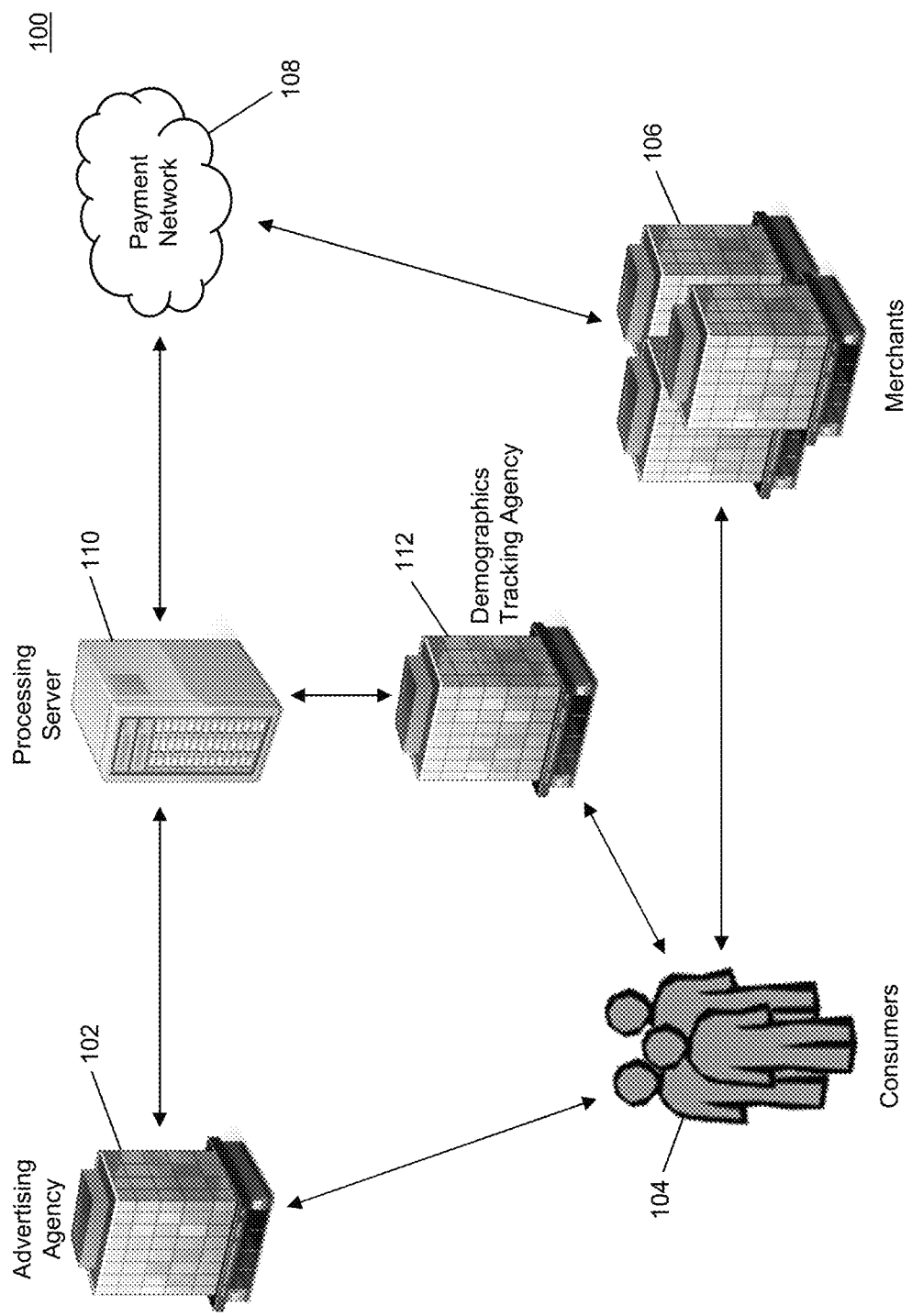
FIG. 1 is a high level architecture illustrating a system for creating a control group of consumers for campaign measurements in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Personally identifiable information (PII)—PII may include information that may be used, alone or in conjunction with other sources, to uniquely identify a single individual. Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc. The present disclosure provides for methods and systems that do not possess any personally identifiable information. Systems and methods apparent to persons having skill in the art for rendering potentially personally identifiable information anonymous may be used, such as bucketing. Bucketing may include aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74, 999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the systems and methods described herein may not possess the PII or be able to decrypt the encrypted PII.

Microsegment—A representation of a group of consumers that is granular enough to be valuable to advertisers, marketers, offer providers, merchants, retailers, etc., but still maintain a high level of consumer privacy without the use or obtaining of personally identifiable information. Microsegments may be given a minimum or a maximum size. A minimum size of a microsegment would be at a minimum large enough so that no entity could be personally identifiable, but small enough to provide the granularity needed in a particular circumstance. Microsegments may be defined based on geographical or demographical information, such as age, gender, income, marital status, postal code, income, spending propensity, familial status, etc., behavioral variables, or any other suitable type of data, such as discussed herein. The granularity of a microsegment may be such that behaviors or data attributed to members of a microsegment may be similarly attributable or otherwise applied to consumers having similar characteristics. In some instances, microsegments may be grouped into an audience. An audience may be any grouping of microsegments, such as microsegments having a common data value, microsegments encompassing a plurality of predefined data values, etc. In some instances, the size of a microsegment may be dependent on the application. An audience based on a plurality of microsegments, for instance, might have ten thousand entities, but the microsegments would be aggregated when forming the audience and would not be discernible to anyone having access to an audience. Additional detail regarding microsegments and audiences may be found in U.S. patent application Ser. No. 13/437,987, entitled "Protecting Privacy in Audience Creation," by Curtis Villars et al., filed on Apr. 3, 2012, which is herein incorporated by reference in its entirety.

System for Distributing Targeted Content Based on Transit Payment Data

FIG. 1 illustrates a system 100 for the creation of a control group of consumers that corresponds to a group of consumers that participated in a campaign based on spending behaviors and microsegments.

The system 100 may include an advertising agency 102. The advertising agency 102 may identify a group of consumers 104 that includes both consumers that are exposed to an advertisement or that participate in a campaign, and other consumers that are not deliberately exposed to an advertisement or that are not participant in a campaign. It will be apparent to persons having skill in the relevant art that the advertising agency 102 may be a merchant, offer provider, content provider, or other similar entity that measures participation or exposure of consumers 104 to a campaign. The advertising agency 102 may identify which consumers in the group of consumers 104 that are participant in the campaign and which consumers are not participant in the campaign.

The consumers 104 may then conduct payment transactions with one or more merchants 106. The transactions involving the consumers 104 and the merchants 106 may be processed by a payment network 108 using methods and systems that will be apparent to persons having skill in the relevant art. The system 100 may also include a processing server 110. The processing server 110, discussed in more detail below, may be configured to receive transaction data for payment transactions involving the consumers 104 from the payment network 108. The processing server 110 may store the received transaction data in a consumer profile corresponding to each consumer of the group of consumers 104.

The processing server 110 may also identify a microsegment for each consumer to which the respective consumer belongs. In some instances, the microsegments may be identified by a third party. In other instances, the processing server 110 may separate the consumers 104 into microsegments using demographic information associated with each of the consumers 104. In such an instance, the processing server 110 may receive geographical and/or demographic data (e.g., age, gender, income, zip code, postal code, education, occupation, marital status, residential status, familial status, etc.) from a demographics tracking agency 112. The demographics tracking agency 112 may collect the data from the consumers 104, and provide the data to the processing server 110. The processing server 110 may determine the microsegments for the consumers 104 without obtaining or using any personally identifiable information. The processing server 110 may store an identifier for the microsegment to which a consumer belongs in their respective consumer profile.

The processing server 110 may receive measurement profiles from the advertising agency 102. The measurement profiles may correspond to the consumers 104 identified by the advertising agency 102. Each measurement profile may identify a consumer in the group of consumers 104 and may indicate whether or not the identified consumer participated in a campaign. In an exemplary embodiment, the identification of the consumer may not be personally identifiable as to the actual consumer. For example, the measurement profile may include a unique identification value that may be uniquely associated with a consumer, without identification of the specific consumer to which the value is associated.

The processing server 110 may then, as discussed in more detail below, match the received measurement profiles to consumer profiles for the consumers 104. The processing server 110 may then identify a control group of consumers that were not participants in the campaign that corresponds to a campaign group of consumers that were participants in the campaign, using methods discussed herein. The control group consumers may correspond to the campaign group consumers based on microsegments and spending behaviors. The spending behaviors may be based on the transaction data for payment transactions involving each consumer, and may be calculated and/or identified by the processing server 110 or a third party (e.g., the payment network 108). In some embodiments, the processing server 110 may be included as part of the payment network 108, the advertising agency 102, and/or any other suitable entity.

By identifying a control group via microsegments and spending behavior, the processing server 110 may be able to identify a control group that very closely corresponds to the campaign group, which thereby may provide for more accurate and/or more effective measuring of the effectiveness of the campaign. In addition, the use of microsegments may ensure that consumers in both groups are not only separated into smaller groups that are more effective for analysis of advertising, but are also protected in terms of consumer privacy. The use of microsegments may ensure that no individual consumer is personally identified, while still maintaining a level of granularity that is beneficial to the advertising agency 102. By also including spending behaviors, the processing server 110 may identify a control group that is even more accurate as to the campaign group than may be provided with demographics alone, which may therefore result in even more accurate and/or effective information for the advertising agency 102.

Processing Server

Figure 2:
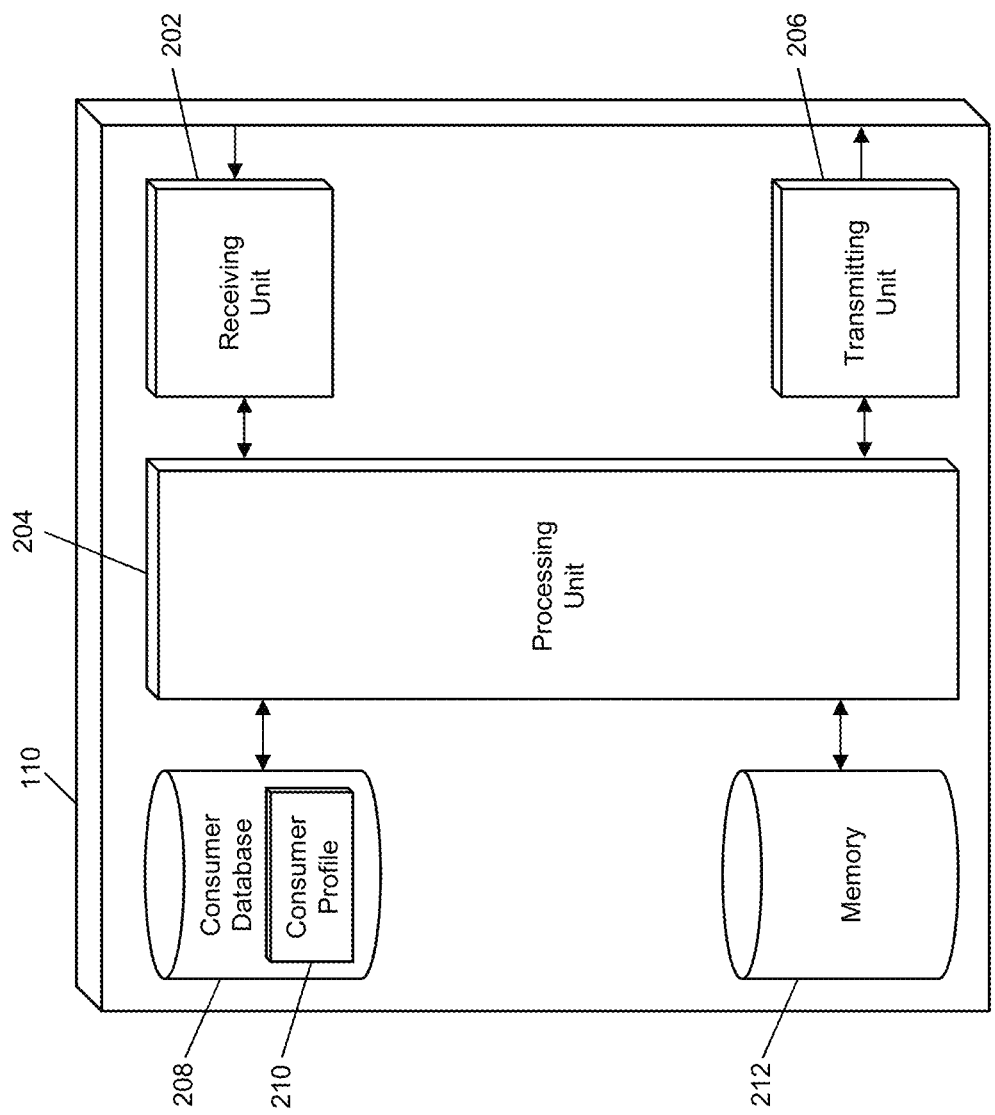
FIG. 2 is a block diagram illustrating the processing server of FIG. 1 for the identification of and creation of a control group of consumers in accordance with exemplary embodiments.

FIG. 2 illustrates an embodiment of the processing server 110 of the system 100. It will be apparent to persons having skill in the relevant art that the embodiment of the processing server 110 illustrated in FIG. 2 is provided as illustration only and may not be exhaustive to all possible configurations of the processing server 110 suitable for performing the functions as discussed herein. For example, the computer system 700 illustrated in FIG. 7 and discussed in more detail below may be a suitable configuration of the processing server 110.

The processing server 110 may include a receiving unit 202. The receiving unit 202 may be configured to receive data over one or more networks via one or more network protocols. The receiving unit 202 may be configured to receive transaction data and/or spending behaviors from the payment network 108, measurement profiles from the advertising agency 102, and/or demographics data from the demographics tracking agency 112. The receiving unit 202 may also be configured to receive a request for a campaign group and/or campaign effectiveness, such as from the advertising agency 102.

The processing server 110 may further include a processing unit 204. The processing unit 204 may be configured to generate a plurality of consumer profiles 210 to be stored in a consumer database 208. Each consumer profile 210 may include data related to a consumer of the group of consumers 104 and include data received by the receiving unit 202. Each consumer profile 210 may include at least an account identifier, a spend behavior, and a microsegment associated with the respective consumer.

The account identifier may be a unique value associated with the specific consumer profile 210 and/or related consumer. In some embodiments, the account identifier may be a payment account number corresponding to a payment account associated with the related consumer. In further embodiments, the account identifier may be an encrypted payment account number. In some instances, the account number may be encrypted via a cryptographic hash function, which may, when applied to the account number, yield the account identifier as a result.

The spend behavior may include one or more calculated and/or identified spending behaviors or representations thereof that are associated with the respective related consumer based on transaction data for payment transactions involving the related consumer. For example, spend behaviors may include a propensity for the related consumer to spend. In one embodiment, the propensity for the consumer to spend may be a single value. In another embodiment, the spend behavior may include a plurality of propensities to spend, with each propensity being a propensity to spend based one of a plurality of different criteria, such as an industry, category, merchant, product, manufacturer, condition, or other criteria as will be apparent to persons having skill in the relevant art. For example, the spend behavior may include a level of rate of spending (e.g., high, medium, or low), propensities to spend at each of a plurality of merchants, propensities to spend at each of a plurality of different merchant types, etc.

The microsegment may be an identifier or other value associated with a microsegment to which the related consumer belongs or corresponds. The identifier may be a number or other unique value corresponding to the microsegment, such as an identification number. In some instances, the value of the microsegment stored in the consumer profile 210 may include the demographics corresponding to the microsegment, to which the related consumer are associated.

The processing unit 204 may be further configured to associated each received measurement profile with a consumer profile 210 stored in the consumer database 208. As discussed in more detail below, measurement profiles may be associated with consumer profiles 210 based on the account identifier or other suitable value. The processing unit 204 may store data included in the measurement profile, such as the indication as to whether or not the related consumer participated in the campaign, in the matched and/or associated consumer profile 210.

In some embodiments, the processing unit 204 may also be configured to calculate spending behaviors. In such an embodiment, each consumer profile 210 may store transaction data for a plurality of payment transactions involving the related consumer, such as received by the receiving unit 202. The transaction data may include transaction amounts, merchant identifiers, transaction times and/or dates, product data, and/or other suitable data as will be apparent to persons having skill in the relevant art. The processing unit 204 may calculate the spending behaviors based on the stored transaction data for each consumer profile 210 and store the calculated spending behavior in the consumer profile 210. The calculation may be performed based on one or more spending rules, which may be stored in a memory 212.

In some embodiments, the processing unit 204 may be configured to identify microsegments to which each consumer of the group of consumers 104 belongs. In such an embodiment, the receiving unit 202 may receive demographic information from the demographics tracking agency 112, which may then be stored in the respective consumer profile 210 for each consumer. The processing unit 204 may then identify a microsegment for each consumer based on the demographic data, and store an identifier corresponding to the identified microsegment in the respective consumer profile 210.

The processing unit 204 may be further configured to create a control group of consumer profiles 210. As discussed in more detail below, the processing unit 204 may identify consumer profiles 210 that correspond to consumers that were indicated to not have participated in the campaign.

Each consumer profile 210 in the control group may include a common microsegment and common spend behavior. The processing unit 204 may also identify a campaign group of consumer profiles 210. Each consumer profile 210 in the campaign group may include the common microsegment and common spend behavior, but may correspond to a consumer that was indicated to have participated in the campaign.

The processing server 110 may further include a transmitting unit 206. The transmitting unit 206 may be configured to transmit data over one or more networks via one or more network protocols. The transmitting unit 206 may be configured to transmit the identified control group and/or campaign group to the advertising agency 102 or other third party. In some instances, the transmitting unit 206 may only transmit the account identifier, common microsegment, and common spend behavior for each consumer profile 210 in the control group and/or campaign group to the advertising agency 102. In such an instance, the advertising agency 102 may therefore not receive any additional consumer data, such as transaction data or demographic data.

In some embodiments, the measurement profiles may include a measurement key. The measurement key may be a unique value used by the advertising agency 102 associated with each consumer of the group of consumers 104. In such an embodiment, the transmitting unit 206 may transmit the measurement key for each consumer in the control group and/or campaign group to the advertising agency 102, in addition to the common microsegment and common spend behavior.

Process for Creating a Control Group

Figure 3:
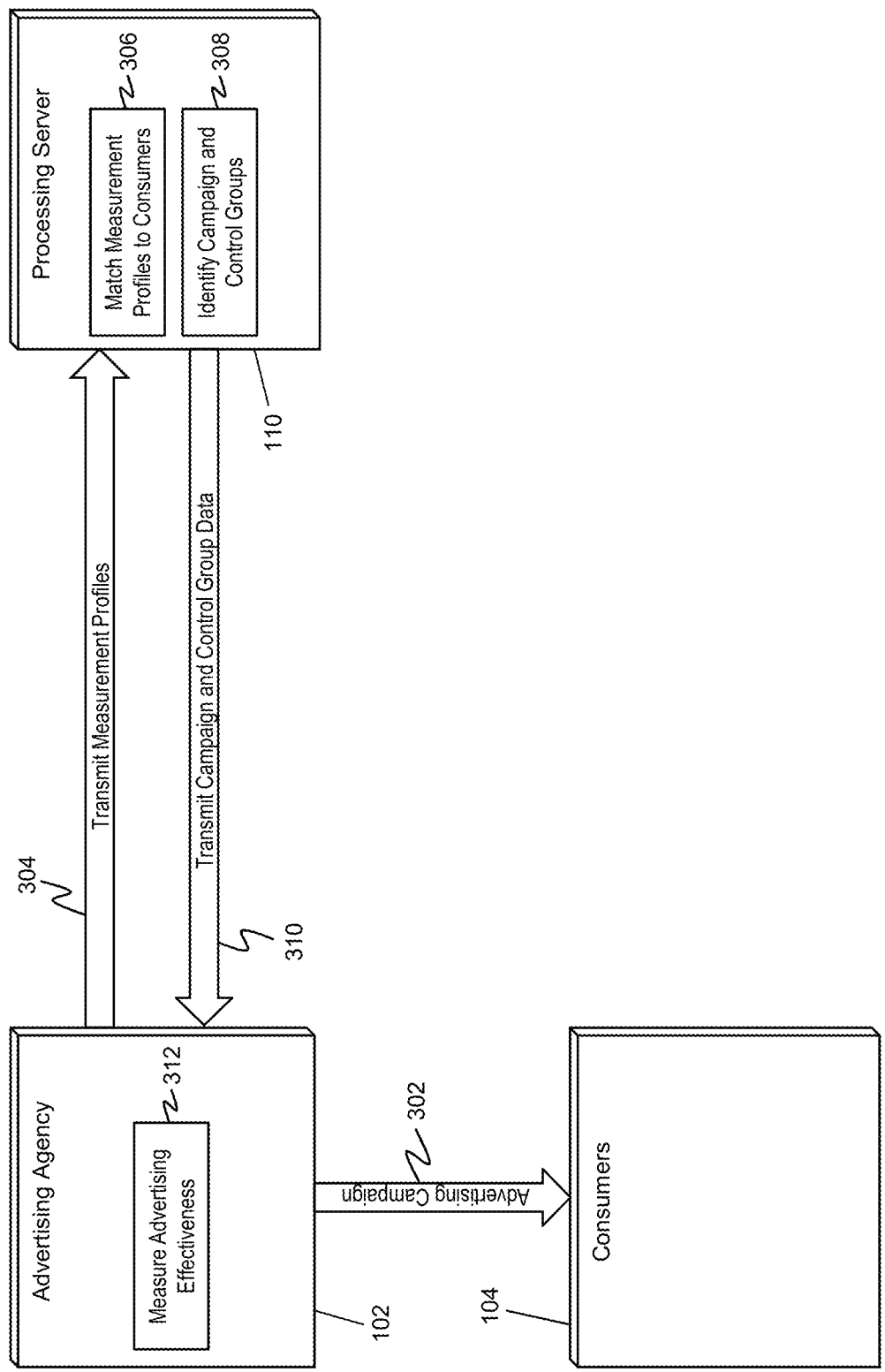
FIG. 3 is a flow diagram illustrating a process for the creation of a control group for campaign measurements using the system of FIG. 1 in accordance with exemplary embodiments.

FIG. 3 illustrates a process for the creation of a control group of consumers for campaign measurements using the system 100 of FIG. 1.

In step 302, the advertising agency 102 may distribute advertisements or otherwise involving consumers of the group of consumers 104 in a campaign. The advertising agency 102 may identify which consumers participate in the campaign, and which consumers do not deliberately participate in the campaign. The advertising agency 102 may include indications of the consumer participation in measurement profiles corresponding to each consumer. Each measurement profile may also include an account identifier associated with the consumer, and/or a measurement key.

In step 304, the advertising agency 102 may transmit the measurement profiles for each consumer to the processing server 110. The processing server 110 may receive (e.g., via the receiving unit 202) the measurement profiles and, in step 306, the processing unit 204 of the processing server 110 may match the received measurement profiles to the consumer profiles 210. The processing unit 204 may match the measurement profiles to the consumer profiles 210 based on correspondence between the account identifiers included in the measurement profiles and the account identifiers included in the consumer profiles 210. The processing unit 204 may store data regarding the association, and/or the data included in the measurement profile itself, in each of the matched consumer profiles 210.

In step 308, the processing unit 204 of the processing server 110 may identify control groups of consumers and campaign groups of consumers. The campaign group of consumers may include one or more consumers (e.g., and/or their related consumer profiles 210) that include a common microsegment and spend behavior and also associated with a measurement profile that indicates participation in the campaign. The control group of consumers may include one or more consumers (e.g., and/or their related consumer profiles 210) that include the same common microsegment and spend behavior, but are associated with a measurement profile that indicates non-participation in the campaign. In some embodiments, the processing server 110 may identify multiple campaign and control groups, such as for a single microsegment and plurality of spending behaviors, for a plurality of microsegments and a single spend behavior, a plurality of both microsegments and spending behaviors, or to ensure that each measurement profile is accounted for in a control group or campaign group.

In step 310, the transmitting unit 206 of the processing server 110 may transmit the identified control group and campaign group to the advertising agency 102. In some embodiments, the processing server 110 may transmit the consumer profiles 210 for each group to the advertising agency 102. In other embodiments, the processing server 110 may transmit only the account identifier and/or measurement key and the spending behavior and microsegment included in the corresponding consumer profile 210 for each consumer in the respective groups. In step 312, the advertising agency 102 may measure the effectiveness of the advertising campaign using methods that will be apparent to persons having skill in the relevant art, but which may be enhanced by the accurately identified campaign and control groups courtesy of the processing server 110.

Figure 4:
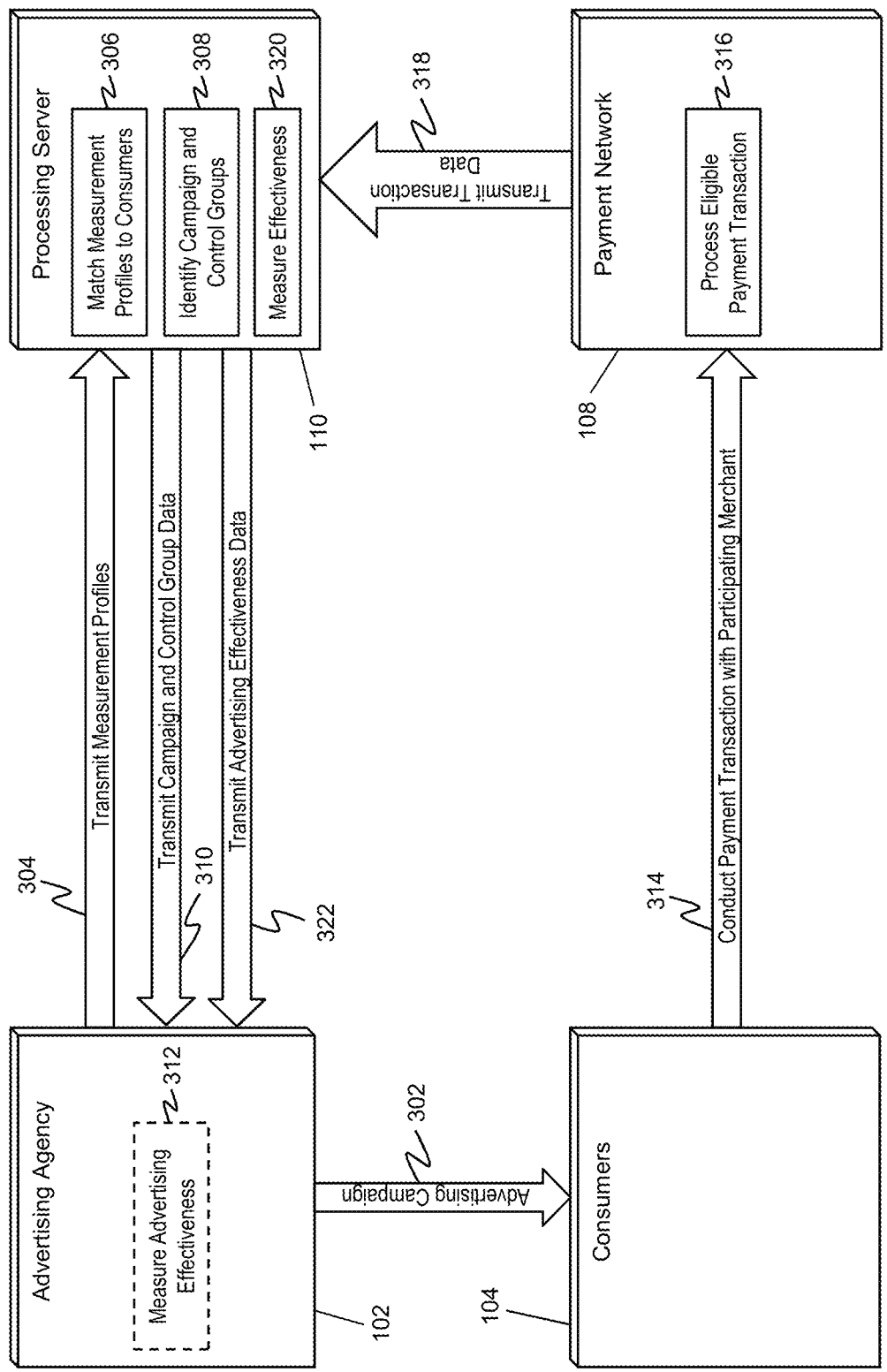
FIG. 4 is a flow diagram illustrating a process for the measuring of advertising effectiveness based on a created control group using the system of FIG. 1 in accordance with exemplary embodiments.

FIG. 4 illustrates an alternative process for creation of the campaign and control groups where the processing server 110 measures the effectiveness of the campaign based on the created campaign and control groups. As illustrated in FIG. 4, in the alternative embodiment, step 312 may be an optional step.

In step 314, the consumers 104 may conduct payment transactions with merchants 106 that are participating in or otherwise are associated with the campaign being conducted by the advertising agency 102. In step 316, the payment network 108 may process the payment transactions involving the consumers 104 and merchants 106 using methods that will be apparent to persons having skill in the relevant art. In step 318, the payment network 108 may transmit transaction data for each of the processed transactions to the processing server 110.

The processing server 110 may receive the transaction data, which may be stored in corresponding consumer profiles 210. In step 320, the processing unit 204 of the processing server 110 may measure the effectiveness of the campaign based on the transaction data for each of the consumers in the control group and the campaign group. Methods for measuring effectiveness of a campaign for a control and campaign group based on transaction data will be apparent to persons having skill in the relevant art. In some embodiments, the processing unit 204 may utilize one or more rules or algorithms stored in the memory 212. In step 322, the transmitting unit 206 of the processing server 110 may transmit the advertising campaign effectiveness data to the advertising agency 102.

Creation of Control and Campaign Groups

Figure 5:
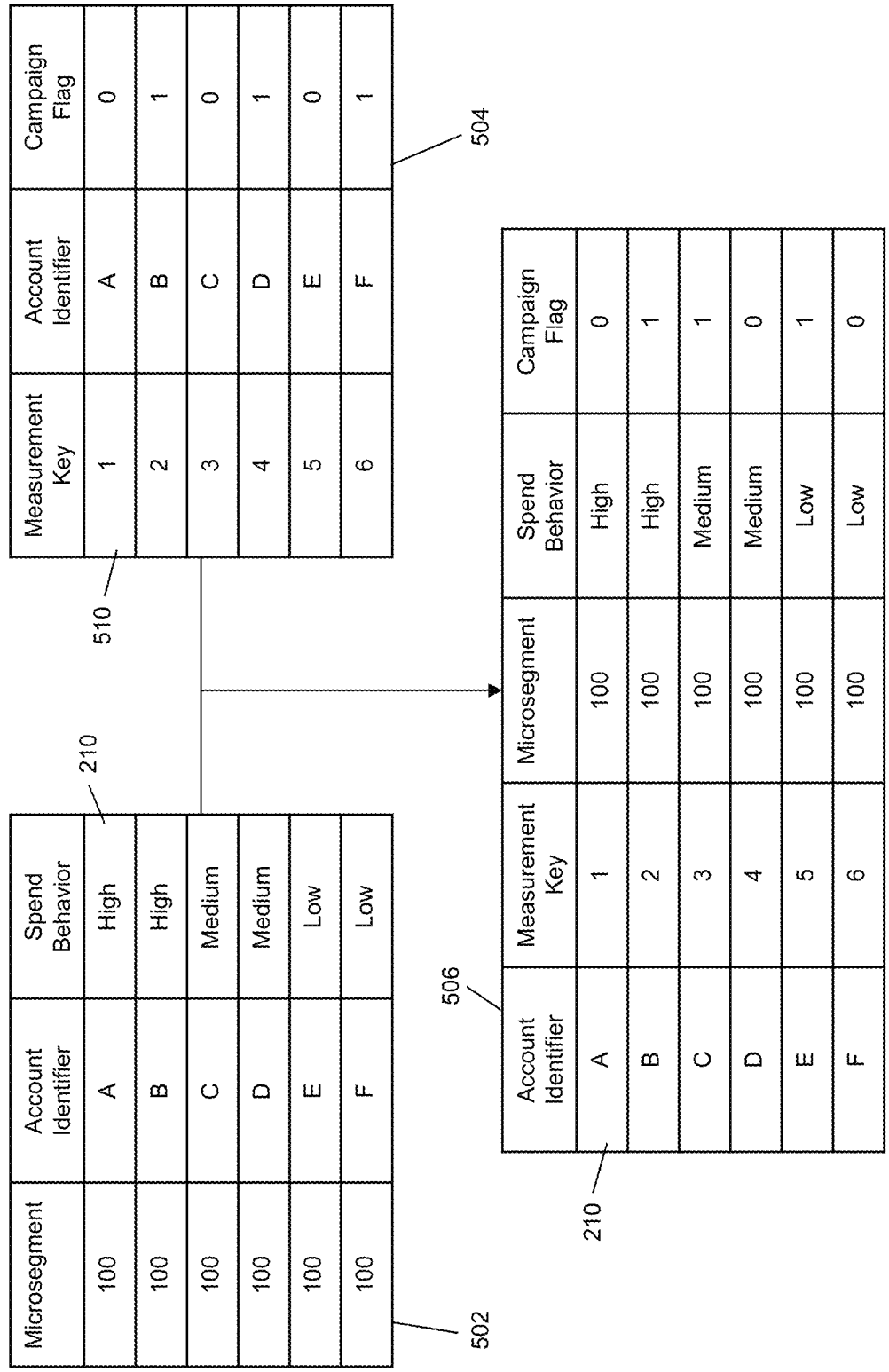
FIG. 5 is a diagram illustrating the association of consumer profiles with measurement profiles for the creation of a control group for campaign measurements in accordance with exemplary embodiments.

FIG. 5 is an illustration of the association of measurement profiles with consumer profiles 210 and identification thereof for the creation of control groups and campaign groups using the methods and systems as discussed herein. Additionally, it is noted that the example illustrated in FIG. 5 and discussed herein is provided as an illustration only and that additional examples of the associating of measurement profiles to consumer profiles and use thereby to create control groups will be apparent to persons having skill in the relevant art.

A table 502 includes a plurality of consumer profiles 210, such as the consumer profiles 210 stored in the consumer database 208. Each consumer profile 210 may include an account identifier, a microsegment identifier, and at least one spend behavior. As illustrated in FIG. 5, each consumer profile 210 of the table 502 corresponds to a consumer in the same microsegment, which has a microsegment identifier of 100.

A table 504 may include a plurality of measurement profiles 510, such as measurement profiles 510 provided by the advertising agency 102 and received by the receiving unit 202 of the processing server 110. Each measurement profile 510 may be related to a consumer of the consumers 104 and include a unique measurement key, an account identifier, and an indication of whether the related consumer was a participant or non-participant in the campaign. As illustrated in FIG. 5, the indication may be a campaign flag, which may have a value of 0 to indicate non-participation in the campaign and a value of 1 to indicate participation in the campaign.

The processing unit 204 may be configured to identify associations between the consumer profiles 210 and the measurement profiles 510 based on the included account identifiers. The processing unit 204 may then store the data included in each of the measurement profiles 510 to their associated consumer profiles 210, as illustrated in a table 506 illustrated in FIG. 5. The resulting consumer profiles 210 may therefore include the account identifier, unique measurement key, microsegment, spend behavior, and indication of participation or non-participation in the campaign for each consumer.

The processing unit 204 may then identify control groups and campaign groups of consumers that have common microsegments and common spend behaviors. In the example illustrated in FIG. 5, the processing unit 204 may identify three separate pairs of control groups and corresponding campaign groups. A first control group may include the consumer related to the account identifier A, with the corresponding campaign group including the consumer related to the account identifier B. The first grouping would thus include consumers that are in microsegment 100 that have a high propensity to spend. Although in the example each group includes a single consumer, it will be apparent to persons having skill in the relevant art that campaign and control groups may include a plurality of consumers, and, in some instances, may include a different number of consumers.

Exemplary Method for Creating a Control Group for Campaign Measurements

Figure 6:
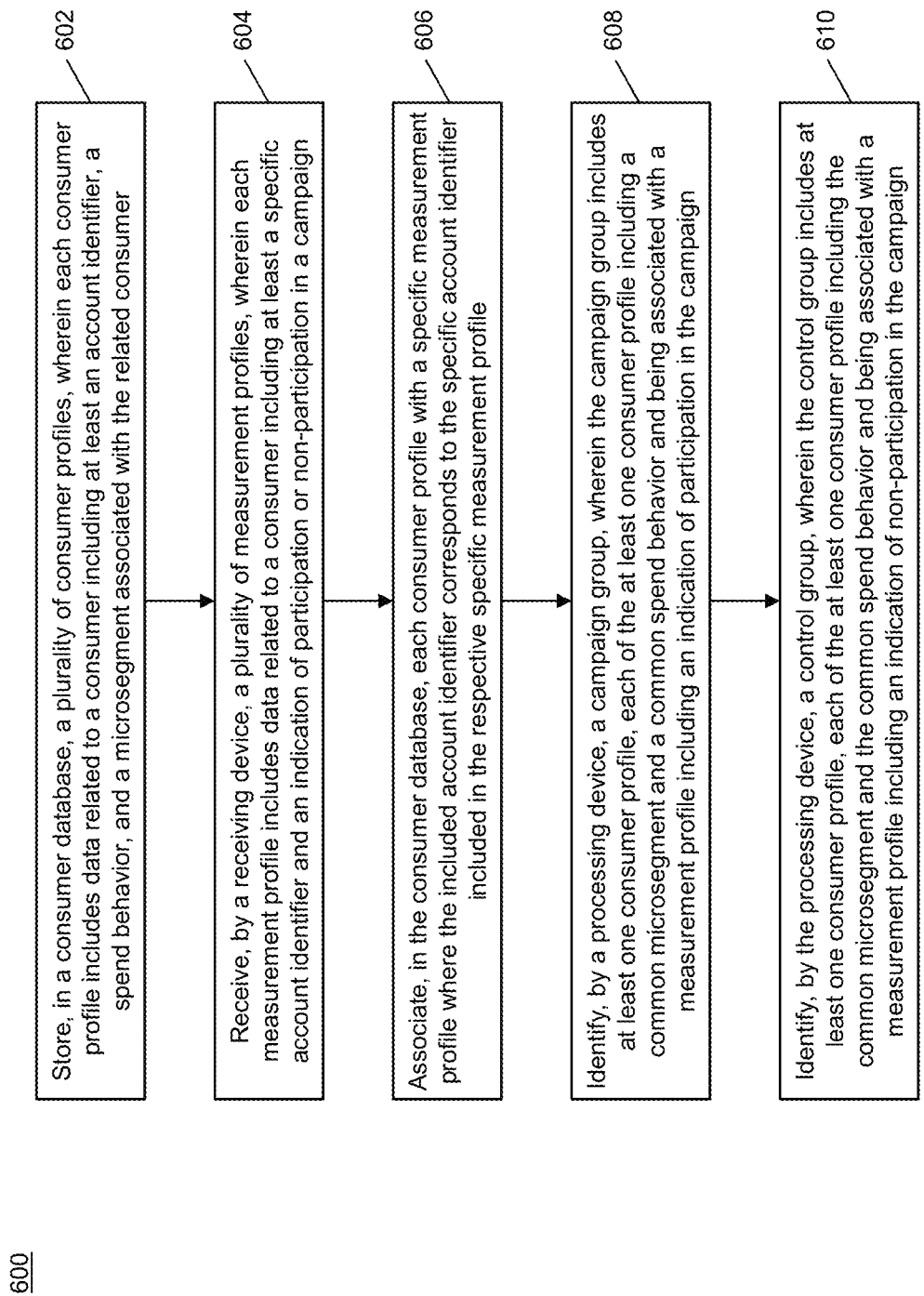
FIG. 6 is a flow chart illustrating an exemplary method for the creating of a control group for campaign measurements in accordance with exemplary embodiments.

FIG. 6 illustrates a method 600 for the creation of a control group of consumers for campaign measurements that are associated with the microsegments and spend behaviors of a corresponding campaign group of consumers.

In step 602, a plurality of consumer profiles (e.g., the consumer profiles 210) may be stored, in a consumer database (e.g., the consumer database 208), wherein each consumer profile 210 includes data related to a consumer including at least an account identifier, a spend behavior, and a microsegment associated with the related consumer. In one embodiment, the spend behavior may include at least one propensity to spend. In a further embodiment, the at least one propensity to spend may include a propensity to spend among at least one of a plurality of: categories, industries, merchants, products, manufacturers, and conditions. In a preferred embodiment, the consumer profile 210 may not include any personally identifiable information.

In one embodiment, the account identifier may be a payment account number corresponding to a payment account associated with the related consumer. In another embodiment, the account identifier may be an encrypted payment account number corresponding to a payment account associated with the related consumer. In a further embodiment, the encrypted payment account number may be obtained by application of a cryptographic hash function to an unencrypted payment account number.

In step 604, a plurality of measurement profiles (e.g., the measurement profiles 510) may be received, by a receiving device (e.g., the receiving unit 202), wherein each measurement profile includes data related to a consumer including at least a specific account identifier and an indication of participation or non-participation in a campaign. In step 606, each consumer profile 210 may be associated, in the consumer database 208, with a specific measurement profile where the included account identifier corresponds to the specific account identifier included in the respective specific measurement profile.

In step 608, a campaign group may be identified, by a processing device (e.g., the processing unit 204), wherein the campaign group includes at least one consumer profile 210, each of the at least one consumer profile 210 including a common microsegment and a common spend behavior and being associated with a measurement profile including an indication of participation in the campaign. In step 610, a control group may be identified, by the processing device 204, wherein the control group includes at least one consumer profile 210, each of the at least one consumer profile 210 including the common microsegment and the common spend behavior and being associated with a measurement profile including an indication of non-participation in the campaign.

In some embodiments, the method 600 further includes transmitting, by a transmitting device (e.g., the transmitting unit 206), the identified campaign group and the identified control group. In one embodiment, each measurement profile 510 may further include a measurement key. In a further embodiment, the method 600 may further include transmitting, by the transmitting device 206, at least the unique measurement key, the common microsegment, and the common spend behavior included in each of the at least one consumer profile 210 in the campaign group and the control group.

In one embodiment, each consumer profile 210 may further include a plurality of transaction data entries, each transaction data entry including data related to a payment transaction involving the related consumer and including transaction data. In a further embodiment, the method 600 may further include calculating, for each consumer profile 210, a consumer spend behavior based on the transaction data included in each transaction data entry included in the respective consumer profile 210, wherein the spend behavior included in each consumer profile 210 is the calculated spend behavior.

Computer System Architecture

Figure 7:
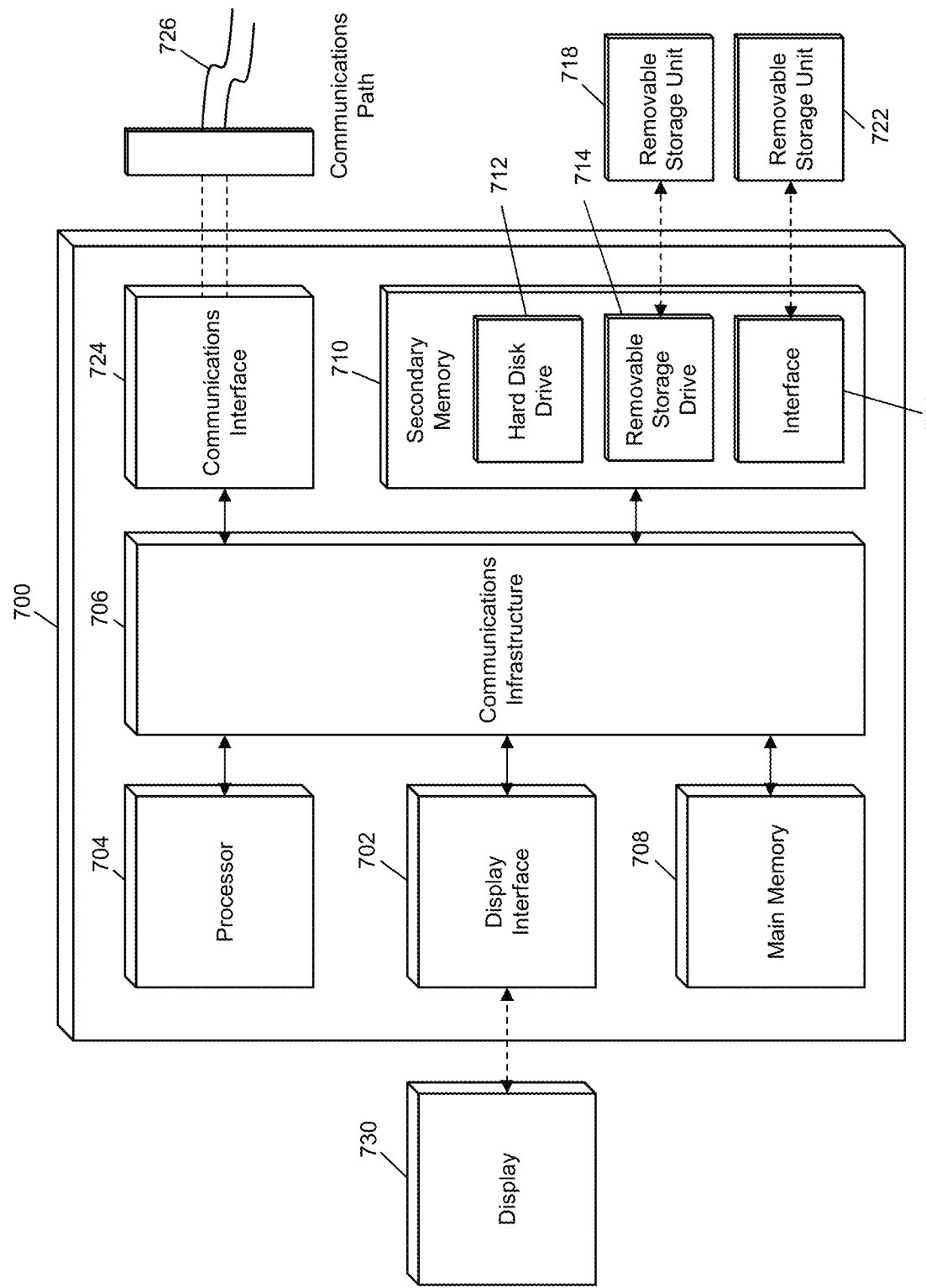
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 110 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4, and 6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor 704 may be a special purpose or a general purpose processor device. The processor 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a USB port, the removable storage unit 718 may be a USB portable flash drive. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3, 4, and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for distributing targeted content to a consumer. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for creating a control group for campaign measurements, comprising:

receiving, in a communications interface of a processing server from a payment network, transaction data resulting from payment transactions conducted by a group of consumers at one or more merchants;

storing, in memory of the processing server, a plurality of consumer profiles, wherein each consumer profile includes consumer data extracted from the transaction data and including at least an account identifier, and a spend behavior, and each consumer profile does not include any personally identifiable information, the spend behavior of the consumer profile being derived from transaction data entries for the payment transactions conducted by the consumer and processed by the payment network;

generating, in a processing device of the processing server, a plurality of consumer profile segments to which the plurality of consumer profiles is associated, each profile segment relating to information associated with at least two of the plurality of consumer profiles;

receiving from a remote device, in the communications interface of the processing server over a data network, a plurality of measurement profiles, wherein each measurement profile includes at least a specific account identifier and an indication of participation or non-participation in a campaign being measured;

associating, in a processing device of the processing server, each consumer profile with a specific measurement profile included in the plurality of measurement profiles where the account identifier extracted from the transaction data corresponds to the specific account identifier included in the specific measurement profile;

identifying, in the processing device of the processing server, a campaign group, wherein the campaign group includes at least one first consumer profile included in a specified segment of the plurality of consumer profile segments, each first consumer profile has a common spend behavior computed from the received transaction data and is associated with the specific measurement profile including an indication of participation in the campaign being measured;

identifying, in the processing device of the processing server, a control group, wherein the control group includes at least one second consumer profile included in the specified segment, each second consumer profile including the common spend behavior and is associated with the specific measurement profile including an indication of non-participation in the campaign being measured; and transmitting, by a transmitting device over the data network, the identified campaign group and control group to the remote device.

2. The method of claim 1, wherein each consumer profile further includes a plurality of transaction data entries, each transaction data entry including data related to a payment transaction involving a related consumer and including transaction data, and the method further comprises:

calculating, for each consumer profile, a consumer spend behavior based on the transaction data included in each transaction data entry included in the consumer profile, wherein the spend behavior included in each consumer profile is the calculated spend behavior.

3. The method of claim 1, wherein the spend behavior includes at least one propensity to spend.

4. The method of claim 3, wherein the at least one propensity to spend includes a propensity to spend among at least one of a plurality of: categories, industries, merchants, products, manufacturers, and conditions.

5. The method of claim 1, wherein each measurement profile further includes a unique measurement key.

6. The method of claim 5, further comprising:
transmitting, by the transmitting device, at least the unique measurement key, common segment, and common spend behavior included in each of the at least one consumer profile in the campaign group and the control group.

7. The method of claim 1, wherein the account identifier is a payment account number corresponding to a payment account associated with a related consumer.

8. The method of claim 1, wherein the account identifier is an encrypted payment account number corresponding to a payment account associated with a related consumer.

9. The method of claim 8, wherein the encrypted payment account number is obtained by application of a cryptographic hash function to an unencrypted payment account number.

10. A system for creating a control group for campaign measurements, comprising:
a receiving device configured to receive transaction data resulting from payment transactions conducted by a group of consumers at one or more merchants;
a consumer database of a processing server configured to:
store a plurality of consumer profiles, wherein each consumer profile includes consumer data extracted from the transaction data and including at least an account identifier, and a spend behavior, and each consumer profile does not include any personally identifiable information, the spend behavior of the consumer profile being derived from transaction data entries for the payment transactions conducted by the consumer and processed by a payment network;
the receiving device further configured to receive from a remote device over a data network, a plurality of measurement profiles, wherein each measurement profile includes at least a specific account identifier and an indication of participation or non-participation in a campaign being measured; and
a processing device configured to:
generate a plurality of consumer profile segments to which the plurality of consumer profiles is associated, each profile segment relating to information associated with at least two of the plurality of consumer profiles;
associate, in the consumer database, each consumer profile with a specific measurement profile included in the plurality of measurement profiles where the account identifier extracted from the transaction data corresponds to the specific account identifier included in the specific measurement profile;
identify a campaign group, wherein the campaign group includes at least one first consumer profile associated with a specified profile segment of the plurality of consumer profile segments, each of the first consumer profiles including a common spend behavior computed from the received transaction data and is associated with the specific measurement profile including an indication of participation in the campaign being measured; and
identify a control group, wherein the control group includes at least one second consumer profile associated with the specified profile segment of the plurality of consumer profile segments, each second consumer profile including the common spend behavior and is associated with the specific measurement profile including an indication of non-participation in the campaign being measured; and
a transmitting device configured to transmit the identified campaign group and control group to the remote device over the data network.

11. The system of claim 10, wherein:
each consumer profile further includes a plurality of transaction data entries, each transaction data entry including data related to a payment transaction involving a related consumer and including transaction data;
the processing device is further configured to calculate, for each consumer profile, a consumer spend behavior based on the transaction data included in each transaction data entry included in the consumer profile; and
the spend behavior included in each consumer profile is the calculated spend behavior.

12. The system of claim 10, wherein the spend behavior includes at least one propensity to spend.

13. The system of claim 12, wherein the at least one propensity to spend includes a propensity to spend among at least one of a plurality of: categories, industries, merchants, products, manufacturers, and conditions.

14. The system of claim 10, wherein each measurement profile further includes a unique measurement key.

15. The system of claim 14, wherein the transmitting device is further configured to transmit at least the unique measurement key, common segment, and common spend behavior included in each of the at least one consumer profile in the campaign group and the control group.

16. The system of claim 10, wherein the account identifier is a payment account number corresponding to a payment account associated with a related consumer.

17. The system of claim 10, wherein the account identifier is an encrypted payment account number corresponding to a payment account associated with a related consumer.

18. The system of claim 17, wherein the encrypted payment account number is obtained by application of a cryptographic hash function to an unencrypted payment account number.

* * * * *